United States Patent [19]
Maul

[11] Patent Number: 5,158,321
[45] Date of Patent: Oct. 27, 1992

[54] TORSIONAL SUSPENSION UNIT

[75] Inventor: Donald Maul, Wausau, Wis.

[73] Assignees: Leslie M. Simmons, Boca Raton, Fla.; Charles E. Wharton, Lake Bluff, Ill. ; a part interest to each

[21] Appl. No.: 773,153

[22] Filed: Oct. 8, 1991

Related U.S. Application Data

[63] Continuation of Ser. No. 478,519, Feb. 12, 1990, abandoned.

[51] Int. Cl.$^5$ .................. B60G 3/00; B60G 11/20
[52] U.S. Cl. ..................... 280/700; 280/723; 267/285
[58] Field of Search .............. 280/690, 700, 721, 723; 267/273, 284, 285, 277, 154

[56] References Cited

U.S. PATENT DOCUMENTS

| | | | |
|---|---|---|---|
| 2,809,029 | 10/1957 | Christoph | 267/154 |
| 4,723,790 | 2/1988 | Wharton | 280/700 |
| 4,744,588 | 5/1988 | Wharton | 280/700 |
| 4,917,402 | 4/1990 | Reynolds et al. | 280/700 |
| 4,921,231 | 5/1990 | Reynolds et al. | 267/196 |

FOREIGN PATENT DOCUMENTS

| | | | |
|---|---|---|---|
| 42214 | 5/1930 | Denmark | 267/284 |
| 881390 | 4/1943 | France | 267/285 |

Primary Examiner—Charles A. Marmor
Assistant Examiner—Tamara L. Graysay
Attorney, Agent, or Firm—Gerstman & Ellis, Ltd.

[57] ABSTRACT

A torsional suspension unit is provided which includes at least one, and preferably a plurality of, torsion rod(s) for absorbing and distributing forces and a bearing block associated with said torsion rod(s) for maintaining one end of said torsion rod(s) in a substantially fixed position. The torsional suspension unit of the present invention also includes a rotatable torque hub member for maintaining a second end of said torsion rod(s), for imparting rotational or torsional forces to said torsion rod(s) and limiting the rotation of said torsion rod(s). The suspension unit of the present invention also preferably includes torsion rod(s) which are non-linear in configuration for improved strength and for improved resistance of the torsion rod to torsional rotation.

19 Claims, 4 Drawing Sheets

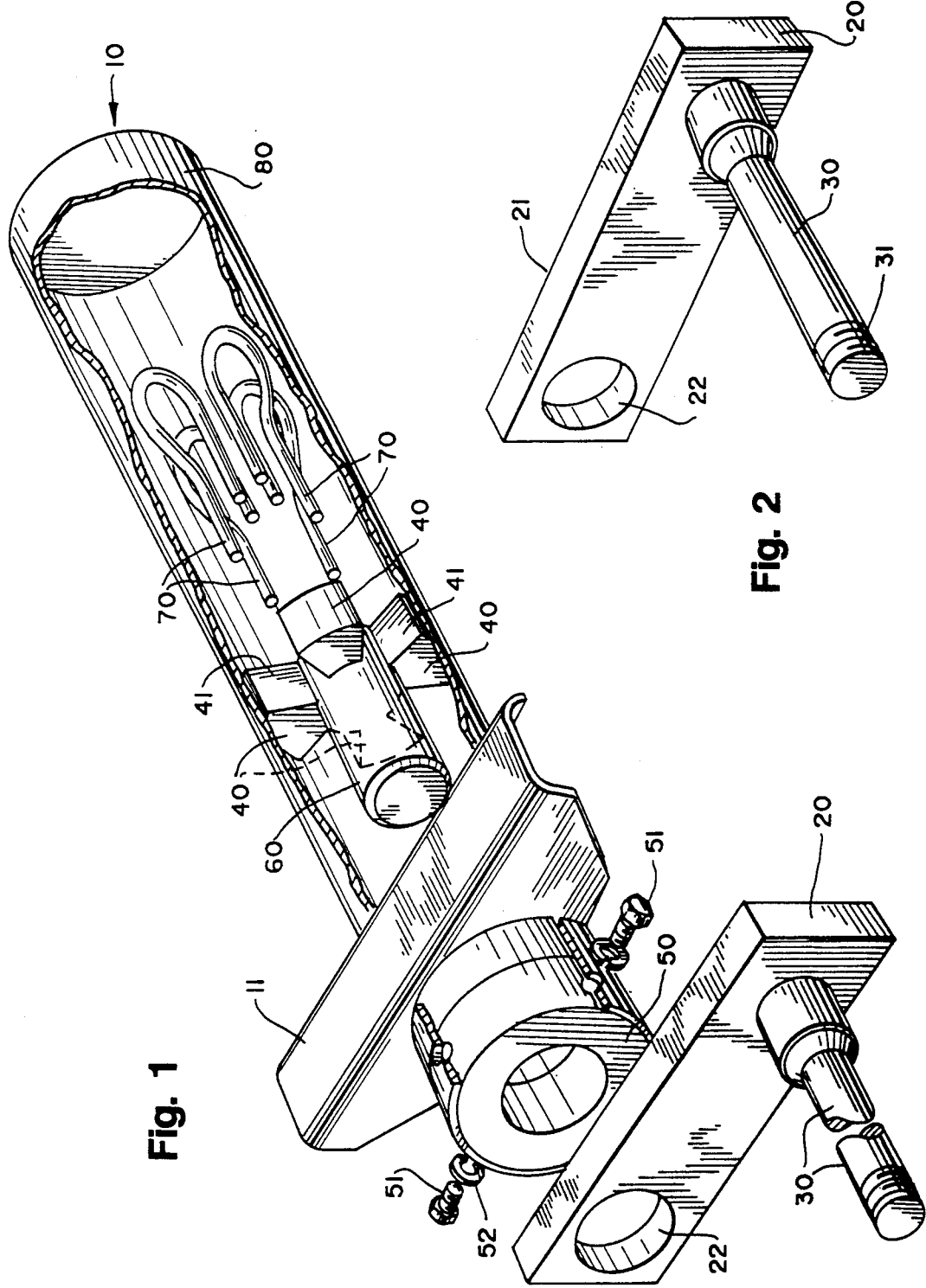

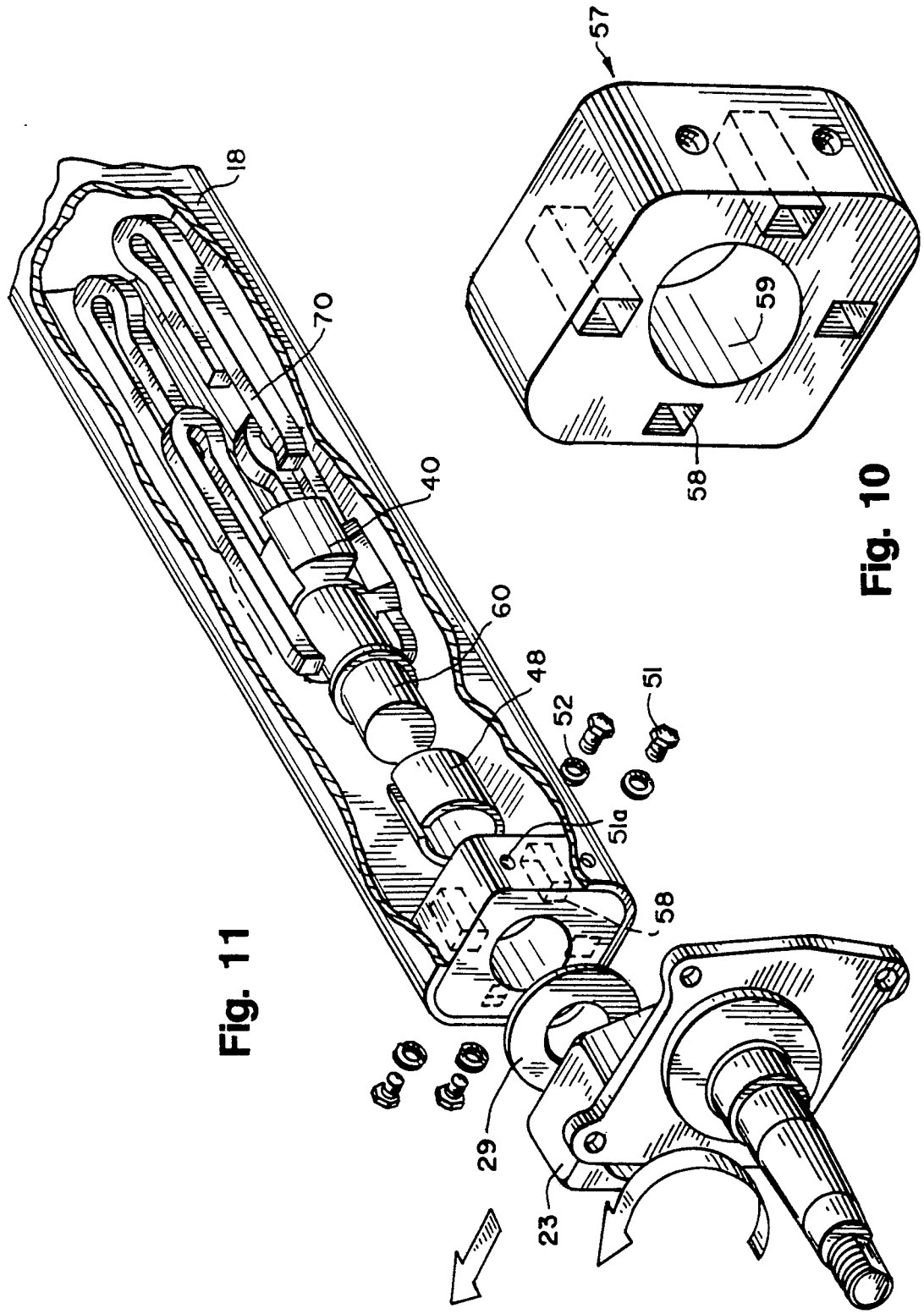

TORSIONAL SUSPENSION UNIT

CROSS REFERENCE TO RELATED APPLICATION

This application is a continuation of U.S. application Ser. No. 478,519, filed Feb. 12, 1990, abandoned, by Donald Maul and entitled Torsional Suspension Unit.

BACKGROUND OF THE INVENTION

I. Field of the Invention

The invention in general relates to suspension systems for vehicles including trailers and trailing vehicles. In particular, the invention relates to torsional suspension systems with nonlinear torsion rods and a rotatable oscillating torque hub which is capable of limiting the rotational or torsional movement of the torsion rods.

II. Description of the Prior Art

Torsional axles have long been used to accomplish a means of suspension. In prior applications, various individuals have used straight or linear torsion rods to absorb the various forces which are imparted while travelling. It has been recognized, however, that the rotational movement of torsion rods within the torsion assembly must be limited to avoid overrotation and breakage of the rods. See for example, U.S. Pat. No. 4,744,588 issued to Charles E. Wharton (assigned to TLW, Inc.) and U.S. Pat. No. 4,723,790 issued to Charles E. Wharton (assigned to TLW, Inc.).

The major problem with linear torsion rods is that they are subject to breakage unless a limiter is used. Linear torsion rods also require use of a rotatable torque hub and a fixed counter-torque hub. In this configuration, the torsion bars are held in place by the counter-torque hub and twist when the torque hub rotates. Overrotation of the torque hub often results in breakage of one or more torsion rods. When a limiter is used to prevent this problem, however, the limiter imparts great force against the axle tubing and, in heavy load situations, may damage the axle tubing, possibly rendering the axle tubing not repairable. The current invention solves those problems by using a torque hub which is capable of limiting the rotational motion of the torque rods without imparting any force directed on the axle tubing.

Another problem with conventional torsional axle designs using linear torsion rods is that the torsion suspension unit must be fairly large to properly absorb the torsional forces. These conventional designs usually employ lengthy torsion rods and require a counter-torque hub, all of which adds to the size, weight and cost of such axle designs. The present invention, with its curved or non-linear torsion rods, eliminates the need for a counter-torque hub and substantially reduces the size, weight and cost of the overall torsion suspension unit. This provides substantial advantages in manufacturing, production and transportation of these units. In addition, roadside repair becomes feasible because the torsional suspension unit is easily removed and torsion rods are easily replaced.

SUMMARY OF THE INVENTION

It is an object of this invention to provide a smaller, lighter weight, less costly and more efficient torsional suspension unit.

It is another object of this invention to provide a torsional suspension unit which may be easily transported or shipped through the United States mail or United Parcel Service to the location of a disabled vehicle.

It is another object of this invention to provide a torsional suspension unit which is able to function without the use of a limiter plate.

It is another object of this invention to provide a torsional suspension unit which is self-limiting and where the limitation on rotational movement does not impart forces directly against the axle tubing.

It is another object of this invention to provide a torsional suspension unit which is capable of being used with axle tubing configurations of a circular cross-section while at the same time providing a limitation on the rotational movement of the torsion bars.

The invention provides an apparatus for torsional suspension which includes a torque arm capable of absorbing various forces, isolating torsional forces and transferring those forces into a system capable of absorbing and dissipating those forces. The torsional suspension unit includes at least one torsion rod for absorbing and distributing forces and a means for fixing the torsion rod ends to a fixed bearing block and a rotatable oscillating torque hub. The torque arm is attached to the wheel assembly of a vehicle through an attachment member. The torsion suspension unit also includes a member for transmitting the torsional forces through an oscillating rotatable torque hub to torsion bars having a non-linear configuration, and an oscillating member for limiting the rotational movement of the torsion bars. Preferably, the limitation on rotation is variable. The torsional suspension unit of the present invention may be used with axles of either a circular or non-circular (or other polygonal) cross-section. In addition, the torque hub limits the rotational movement of the torsion rods without imparting any forces against the axle tubing. Preferably, the torsional suspension unit is self limiting. Preferably, the torsion rods are of a non-linear or curved configuration such that the torsion rods extend a distance which is greater than the distance which is between the bearing block and the torque hub. In accordance with the present invention, the torsion rods may be of a circular or non-circular cross-section. Preferably, the torsion rods of a non-linear or curved configuration can be varied in overall length and diameter to modify the torsional load capabilities of the rods.

The torsional suspension unit of the invention not only provides the objects and advantages described above, but is also relatively less expensive to manufacture and transport, and is more efficient, compared to the prior art devices. Numerous other features, objects and advantages will become apparent from the following detailed description when used in conjunction with the accompanying drawings.

DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

FIG. 1 is an exploded perspective view, with a portion broken away, of one embodiment of the torsional suspension unit of this invention;

FIG. 2 is a perspective of one embodiment of the torque arm portion of FIG. 1;

FIG. 10 is a perspective view of a second embodiment of the bearing block illustrated in FIG. 9; and FIG. 11 is an exploded perspective view similar to FIG. 1 of the torsional suspension unit illustrated in FIG. 9, showing the unit attached to the undercarriage of a vehicle.

DESCRIPTION OF THE PREFERRED EMBODIMENTS

Figure 9:
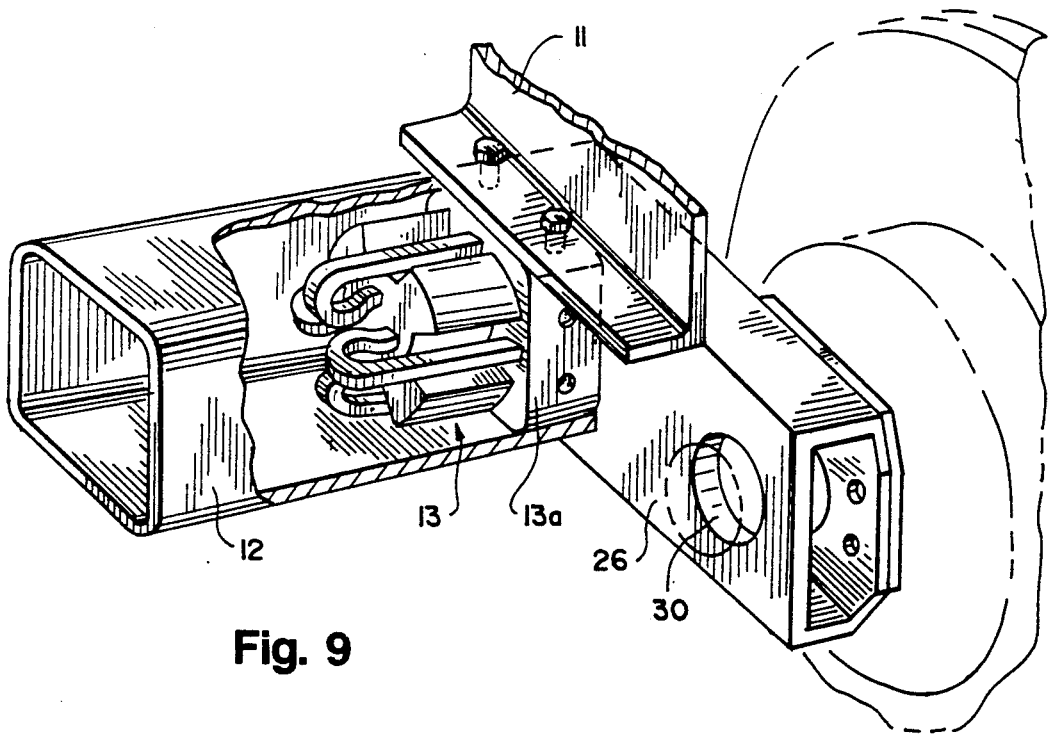
FIG. 9 is a fragmentary perspective view of second embodiment of the torsion bars and torque hub.

Referring to FIGS. 1 and 9, a torsional suspension unit (10) is shown carrying a torque arm (20) which is attached to the torque hub shaft (60) and the torque hub (40). The torque arm (20) is in turn attached to a spindle which carries a wheel (16). Thus, the wheel (16) is capable of travelling, and is linked, independently from any other wheel on the vehicle.

The torque arm (20) is capable of rotational movement over a limited but variable range. The torque arm (20) is welded to the torque hub shaft (60) which passes through a bearing block assembly (50). The torque arm (20) transfers any torsional, vertical, horizontal or shear loads from the tire (16) to the torque hub shaft (60).

The torque arm (20) may be varied in length to accommodate different load requirements. This increases the versatility of applications for the invention. A spindle (30) carries the trailer wheel hubs and tire (16) and which is mounted on the spindle with bearings. The spindle (30) enables the torque arm (20) to transfer all loads to the torque hub shaft (60). The spindle (30) may be welded to the torque arm (20) or it may be forged together with the torque arm (30).

In the embodiment illustrated in FIG. 1, the torque hub shaft (60) is circular in cross-section and extends along the longitudinal axis of axle tube (80). The torsional suspension unit (10) also includes a plurality of torsion rods (70). As illustrated in FIG. 1, a portion of the torsion rods (70) extend parallel to the longitudinal axis of axle tubing (80). In operation, the torque hub shaft (60) rotates axially when a load is transferred from the torque arm (20) to torque hub shaft (60). The torque rods (70) may also be square or any other polygonal shape in cross-section, in which case the apertures in the bearing block (50) are of a similar shape. One such polygonal shaped embodiment is illustrated in FIGS. 9, 10 and 11 and will be described in greater detail hereinafter. Once the torsional force is absorbed and finally removed, the torque hub rotates counter-axially to return to its normal position.

The torque hub shaft (60) passes through the bearing block assembly (50) which enables the torque hub shaft to rotate freely within the bearing block assembly (50). Such rotational movement allows loads to be transferred from the torque arm (20) to the torsion rods (70).

Torque hub shaft (60) is attached to the torque hub (40) and may be welded together or may be machined steel formed into a single piece. Torque hub (40) allows torsional loads to be transferred from the torque hub shaft (60) to the torsion rods (70). Torque hub (40) and torque hub shaft (60) also allow transmission of bending movements and sheer loads through the bearing block (50). The length of the torque hub shaft (60) may be varied to accommodate the axle load capacity. The diameter of the shaft (60) may also be varied to accommodate various load and vehicle applications.

Torque hub (40) is configured to allow one end of the torsion rod (70) to be mounted to the distal end of the torque hub and to allow a segment of each torsion rod to pass through one of a predetermined number of channels in the torque hub. (See FIGS. 6 and 7). The other end of the torsion rod (70) is seated in the bearing block (50) (See FIGS. 4 and 10).

The number of channels (41) in the torque hub (40) may be varied for different load applications to permit use of a varying number of torsional bars (70). The size of each such channel (41) ma also be varied to control the amount of rotational movement of the torque hub shaft (60) and to accommodate various sized torsional rods.

Figure 4:
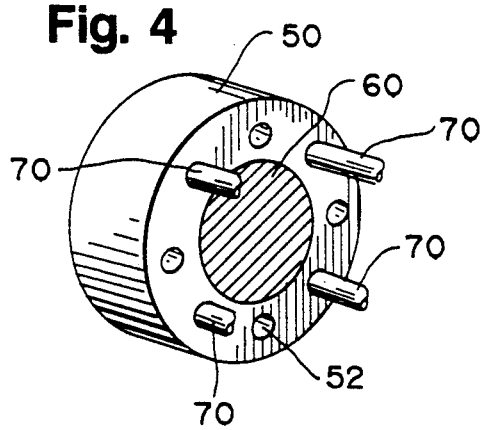
FIG. 4 is a perspective view of the bearing block assembly of FIG. 1 with portions of the torque hub shaft and torque rod inserted in the bearing block.
Figure 5:
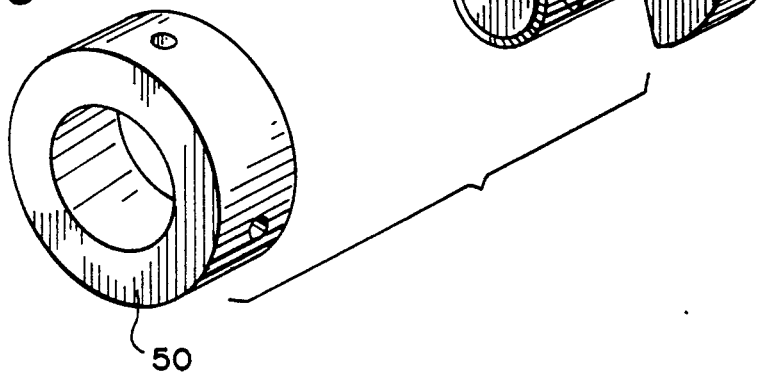
FIG. 5 is a perspective view of the torsional suspension unit of FIG. 1.

In FIGS. 1 and 5, the bearing block (50) is cylindrical and is fixed in place and joined with the axle tube (80) by welding or with bolts (51) and washers (52). The bearing block (50) seats one end of the torsion rods (70) which are forcefully inserted into apertures in the bearing block (40). (See FIGS. 4 and 6). The cylindrical shape of the bearing block (40) enables the block to remain stationary with respect to the axle tube while allowing the torque hub shaft (60) to rotate freely inside. The use of a bearing block in this way eliminates the need for a counter torque hub, which is required with conventional torsion designs.

FIGS. 10 and 11 illustrate an alternate embodiment of bearing block (57). As illustrated, bearing block (57) is alternately shaped in a square, however various other polygonal forms are contemplated, such that the bearing block fits securely in a square or other polygonal shaped complementary axle tube (18). In the alternate embodiment, the bearing block (57) acts as a seat for one end of the torsion rods (70) by forcefully inserting the torsion rods (70) into an aperture (59) in the bearing block as in FIGS. 1 and 5. The configuration of the aperture corresponds to the cross-sectional configuration of the torsion rods (i.e., circular or non-circular). The selection of seating apertures in the alternate embodiment is determined by the size, shape and cross-section of the torsion rods (70). The bearing blocks 50 and 57 in FIGS. 1 and 11, respectively, transmit bending, shear and torsional loads to the axle housing.

The torsion rods (70) may be formed in any cross-sectional shape, although substantial cost savings may be achieved by using circular or substantially circularly shaped rods in certain applications. Torsion rods (70) of a circular or substantially circular cross-section may eliminate some additional costs of forming the rods themselves into a shape other than circular, and also may eliminate the cost of milling complementary apertures in torque hub (40) and bearing block (50). Such additional forming and machining is not required to seat circular rods into the torque hub (40) and the bearing block (50).

The torsion rods (70) may vary in length and diameter according to the desired load rating or capacity. The load capacity of the torsional suspension system invention varies directly with the size of torsion bars (70). The capacity of a torsional suspension unit may also be increased by changing the number and location or placement of the torsion rods. In the preferred embodiment, an even number of rods is used with rods placed symmetrically around the hub. Depending on the application, however, the number of torsion rods and their location with respect to the hub may be altered as required to properly absorb the load.

In the illustrated embodiment, torsion rods (70) are curved or U-shaped, such that each rod extends longitudinally from the bearing block (50), parallel to the torque hub shaft (60) through the torque hub channel (41), beyond torque hub (40). Each torsion rods (70) then curves beyond torque hub (40) in a variety of ways, such that the other end of the torsion rod (the end not connected to bearing block (50)) is seated into the distal end of the torque hub. (See FIGS. 1, 4, 7, 11). The curve must be a sufficient radius to allow the torsion bar (70) to be seated in both the bearing block (50) and torque hub (40), although the shape of the curve need not be symmetrical or uniform in radius or curvature. Each torsion rod (70) may be seated by forcefully inserting the rod ends into the corresponding apertures (52) of torque hub (40) or it may be welded (FIG. 4).

Due to the bent configuration of torsion bars (70), the torsional suspension unit of the present invention is physically smaller in size, and correspondingly of less weight, making it more economical to construct and transport than conventional designs. The size, weight and configuration of the torsional suspension unit disclosed herein allows quick roadside repairs which were never before possible. The torsional suspension unit of the present invention may be easily replaced on a vehicle simply by removing the four bolts (57) and sliding the torsion unit out of the axle housing. The torsion rod seating method permits easy removal and replacement of broken rods, eliminating the need for replacement of the entire shaft. The torsion bar design utilized in the present invention also provides manufacturing and production advantages which are not found in prior torsional suspension unit and torsional axle designs.

In addition, the torsion rod configuration, along with the design of the bearing block and torque hub of the present invention, permits applications of this invention with axle tubes having a round cross-sectional shape. This means that the invention can be used for new axle configurations not previously possible and creates new applications for torsional suspension technology, such as automobiles, railroads and other modes of transportation.

In addition to absorbing torsional forces, the torsion rods also provide constant back pressure through the system to maintain the torque arm at its normal or rest position. Unlike other torsional designs, the embodiments of this invention do not require the use of a limiter plate, although a limiter plate could be used if desired. Previous torsional suspension units required the use of a limiter which limited the rotational movement of the torque hub. Use of a limiter prevented the torsion rods from breaking by using a metal plate of a size and shape necessary to allow a predetermined limited range of rotational movement of the torsion rods. Unfortunately, use of a limiter or limiting plate sometimes causes damage to the axle tube in heavy load situations.

The embodiment of this invention eliminates or substantially reduces the possibility of axle tube damage in heavy load situations by eliminating the distribution of forces when the limiter came in contact with the axle housing to prevent further rotation of the torsion rods.

Similarly, the prior designs using a limiter required the use of a square or other polygonal shaped axle housing to allow the limiter to properly contact and engage the axle housing to stop the continued rotational movement of the torsion rods. In the present invention, the torsional suspension unit is self-limiting, primarily through the configuration of the torque hub (40). The size of channels (41) and the size of the torque hub (40) may be varied to modify the range of torsional motion for various loads. As such, this invention is not limited to square or polygonal shaped axle housings, but may be used in axle housings which are circular in cross-section.

Mounting bracket (11) illustrated in FIG. 1 is optional, depending on the mounting requirements of axle tube (10) on a trailer or other vehicle. The mounting bracket (11) illustrated in FIG. 1 is only one of several designs which could be used.

Referring to FIG. 2, torque arm (20) may be varied in length, width and thickness to permit increased load capacities. There is also a direct relationship between the length of the torque arm (20) and the size of the channel (41) illustrated in FIGS. 1 and 7. The torque arm (20) is substantially a rectangularly shaped bar (21). A hole (22) is drilled, punched or machined at one end of the torque arm (20) to permit attachment to the torque hub shaft (60) to the bearing block assembly (50). Spindle (30) is attached to the torque arm (20) by welding or by forging the torque arm (20) and spindle as a single piece. As illustrated, spindle (30) is cylindrical and may be tapered, although various configurations are possible depending on the desired application. The spindle (30) is mounted perpendicular to the torque arm bar (21) at the end opposite the hole (22). The end of the spindle may include threads (31) to permit attachment of a wheel hub, although other methods of attachment may be used.

Figure 3:
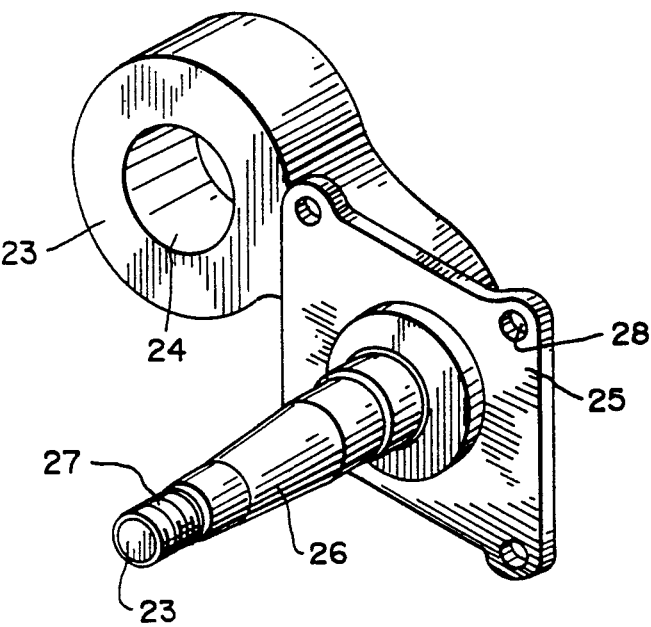
FIG. 3 is a perspective view of an alternative embodiment of the torque arm portion of FIG. 1.

FIG. 3 illustrates an alternative embodiment of the torque arm (23) and spindle assembly (26). The torque arm (23) is oblong and contains a hole (24) at one end to permit attachment to the torque hub shaft (60) and bearing block assembly (50) illustrated in FIG. 1. The brake flange (25) is optional for applications with a load rating of 2500 lbs. or less. With heavier loads, brake flanges are normally required. If required, break flange (25) attaches to a brake assembly by using bolts, pins or other fasteners which are inserted through the four holes (28) in the flange. In FIG. 3, the spindle (26) retains the threaded end design (27) used in FIG. 2 and may be similarly mounted.

FIG. 4 shows a perspective view of the bearing block assembly including bearing block (50) and illustrating the seating of portions of torsion bars 70. The torsion bars (70) are seated in the bearing block (50) and protrude perpendicularly to the plane of the bearing block (50) and substantially parallel to the torque hub shaft (60) which protrudes through the bearing block (50). Since the number of torsion rods (70) may be varied, additional seating holes (52) may be provided in the block.

Figure 6:
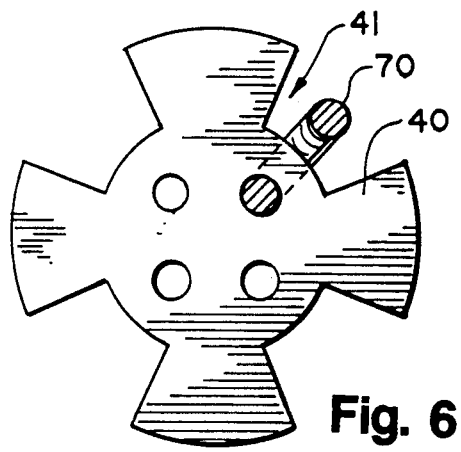
FIG. 6 is an end view of the torque hub assembly of FIG. 1.

FIG. 6 presents an end view of the torsional suspension unit. The configuration of the torque hub (40) may vary with the number of torsion bars required. In FIG.

6, a cross-sectional view of a torsion bar (70) is illustrated with the torsion bar positioned in channel (41). As the number of torsion bars changes, the number of channels (41) changes accordingly. The dimensions of the channels (41) may also be varied to permit greater rotational travel of the torsion bars (70) along the arc of the channel.

Figure 7:
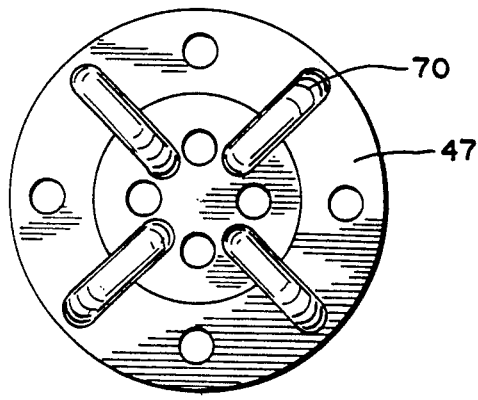
FIG. 7 is an end view of a second embodiment of the torque hub assembly of the present invention with the torque rods inserted.
Figure 8:
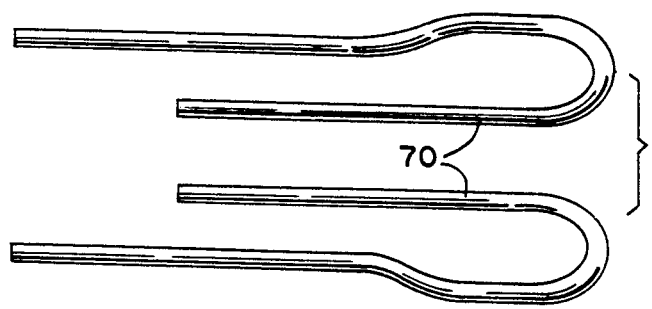
FIG. 8 is a side view of one embodiment of the torsion bars as illustrated in FIG. 1.

FIG. 7 presents a end view of an alternate embodiment of the torque hub assembly (47) which does not use channels to limit the range of torsional motion of the torsion bars (70). In this alternate embodiment, the dimensions of the torsion bars may be altered, or a limiting device used, to limit the rotation of the torsion bars (70). FIG. 7 also illustrates the seating holes (52)-(54) for torsion rods (70), in the specifically flat surface (51A) within bearing block (50).

FIG. 9 illustrates one embodiment of the torsional suspension unit in a square axle tube (12). The mounting bracket (11) mounts the axle tube and suspension system to the vehicle or trailer frame. The torsional suspension unit (13) is shown inserted lengthwise in axle tube (12). FIG. 9 shows an alternate embodiment of the bearing block assembly (13a). In this embodiment, the torque arm (20) is depicted attaching the torsional suspension unit (13) with spindle (30) to the tire (16).

FIG. 10 shows an alternative embodiment of the bearing block (57) for use in a square or other polygonal shaped axle tube. In this embodiment, torsion rods (70) are held secure in the bearing block by forcefully inserting them into appropriately shaped apertures (58) which are formed in the bearing block. An aperture (59) is formed in the center of bearing block (57) and is used to permit torque hub shaft (60) to pass through the bearing block for connection to torque hub (40).

FIG. 11 represents an alternate embodiment of the torsional suspension unit of the present invention and depicts a square axle tube (18), torsion rods (70) which are not circular in cross-section, a torque hub (40) and, a split ring bearing washer (48) which allows the torque hub shaft (60) to rotate within the bearing block (57) of the alternate design. The torsion bars (70) in this embodiment are seated in the torque hub (40) and the bearing block (57). The torsional suspension unit is affixed to the axle tube (18) by using four or more bolts (51) which are inserted through the axle tube (18) and are screwed into threaded apertures (51a) in the bearing block (57). The torque hub shaft (60) protrudes through the hole (59A) in the bearing block (57) and attaches to the torque arm (23). In this embodiment, a washer (29) is inserted between the bearing block (57) and the torque arm (23) to ensure the proper connection. Arrow A in FIG. 11 shows the direction of vehicle movement while Arrow B shows the direction of rotational movement when a force is applied against the torque arm (23).

Accordingly, a torsional suspension unit is provided which exhibits significant advantages over the prior art, in terms of effectiveness, reliability, configuration, weight, size and cost of manufacture. The above is offered for illustrative purposes only and is not intended to limit the scope of the invention of this application.

What is claimed is:

1. A torsional suspension unit comprising:
   at least one torsion rod for absorbing and distributing forces, said torsion rod being substantially U-shaped whereby the ends of said torsion rod face in substantially the same direction;
   means associated with said torsion rod for maintaining one end of said torsion rod in a substantially fixed position; and
   rotatable torque hub means for retaining a second end of said torsion rod, whereby rotational or torsional forces may be applied to said torsion rod by rotation of said torque hub means.

2. The torsional suspension unit of claim 1 further comprising means for variably limiting the range of movement of said torsion rod; and
   means for distributing torsional forces to said torsion rod through said rotatable torque hub means.

3. The torsional suspension unit of claim 1 wherein said torsion rod is of non-circular cross-section.

4. The torsional suspension unit of claim 1 wherein said torsional rod is circular in cross-section.

5. The torsional suspension unit of claim 1 which comprises a plurality of said torsion rods.

6. The torsional suspension unit of claim 1 in which said substantially U-shaped torsion rod defines legs of differing lengths.

7. A torsional suspension unit comprising:
   at least one torsion rod for absorbing and distributing forces;
   means associated with said torsion rod for maintaining one end of said torsion rod in a substantially fixed position;
   rotatable torque hub means retaining a second end of said torsion rod; and
   laterally open channel means having sidewalls positioned to receive a central portion of said torsion rod, whereby upon rotation of said torque hub means said central torsion rod portion within the channel means enters into engagement with a sidewall of said channel means to limit the rotation of said hub and the deformation of said torsion rod.

8. The torsional suspension unit of claim 7 in which said channel means are defined by said torque hub.

9. The torsional suspension unit of claim 8 in which said torsion rod is substantially U-shaped, whereby the ends of said torsion rod extend in substantially the same direction.

10. The torsional suspension unit of claim 9 in which a plurality of said torsion rods are present, at least portions of said torsion rods occupying said channel means.

11. The torsional suspension unit of claim 7 in which said torsion rod is substantially U-shaped, whereby the ends of said torsion rod extend in substantially the same direction.

12. The torsional suspension unit of claim 7 in which a plurality of said torsion rods are present, said torsion rods occupying said channel means.

13. The torsional suspension unit of claim 7 in which said torsion rod is of non-circular cross-section.

14. A torsional suspension unit comprising:
   at least one torsion rod for absorbing and distributing forces, said torsion rod being substantially U-shaped, whereby the ends of said torsion rod extend in substantially the same direction;
   means associated with said torsion rod for maintaining one end of said torsion rod in a substantially fixed position;
   rotatable torque hub means retaining a second end of said torsion rod; and
   channel means having sidewalls positioned to receive a central portion of said torsion rod, whereby upon rotation of said torque hub means said central torsion rod portion within the channel means enters into engagement with a sidewall of said channel means to limit the rotation of said hub and the deformation of said torsion rod.

15. The torsional suspension unit of claim 14 in which said substantially U-shaped torsion rod defines legs of differing lengths.

16. The torsional suspension unit of claim 15 in which a plurality of said torsion rods are present.

17. The torsional suspension unit of claim 14 in which said channel means are laterally open, having sidewalls positioned to receive a central portion of said torsion rod.

18. The torsional suspension unit of claim 17 in which said torsion rod is of non-circular cross-section.

19. The torsional suspension unit of claim 17 in which said substantially U-shaped torsion rod defines legs of differing lengths.

* * * * *